United States Patent [19]

Waldman

[11] Patent Number: 4,768,224
[45] Date of Patent: Aug. 30, 1988

[54] SINGLE TELEPHONE LINE CALL FORWARDING DEVICE

[76] Inventor: Herbert H. Waldman, 1739 52nd St., Brooklyn, N.Y. 11204

[21] Appl. No.: 56,457

[22] Filed: Jun. 1, 1987

Related U.S. Application Data

[63] Continuation-in-part of Ser. No. 724,065, Apr. 17, 1985, Pat. No. 4,670,900.

[51] Int. Cl.⁴ .............................................. H04M 3/54
[52] U.S. Cl. ...................................... 379/211; 379/387
[58] Field of Search ................ 379/210, 211, 212, 387

[56] References Cited

U.S. PATENT DOCUMENTS

| | | | |
|---|---|---|---|
| 4,413,158 | 11/1983 | Danford | 379/211 |
| 4,475,009 | 10/1984 | Rais et al. | 379/211 |
| 4,626,630 | 12/1986 | Waldman | 379/211 |
| 4,670,900 | 6/1987 | Waldman | 379/211 |

*Primary Examiner*—James L. Dwyer
*Attorney, Agent, or Firm*—Louis Orenbuch

[57] ABSTRACT

A device for enabling call forwarding instructions to be given from any telephone need be connected only to the phone line for which call forwarding service has been procured and does not require another phone line to communicate with the device. The device stores the call forwarding instructions in a recorder. The device detects the short ring that occurs on the procured service phone line when a call is forwarded and detects the long ring that occurs when call forwarding is not in effect. Upon detection of a short ring, the device seizes the procured service phone line and places a phone call to the phone line to which the previous call was forwarded. In an alternate embodiment, the device places the phone call to its own procured service phone line. In both embodiments, the device is reset to its stand-by state upon detection of a busy signal. Where a busy signal is not detected, the device transmits a signal that cancels call forwarding and triggers a timer. If another phone call is received at the device within the timing cycle of the timer and an authorization code is received, the device enables the call forwarding instructions in the recorder to be changed. If those conditions are not met the instructions in the recorder remain unchanged. Thereafter, the device twice transmits the stored call forwarding instructions to the central station and thereby reestablishes call forwarding.

3 Claims, 5 Drawing Sheets

SINGLE TELEPHONE LINE CALL FORWARDING DEVICE

RELATED APPLICATION

This application is a continuation-in-part of my parent patent application Ser. No. 724,065, now U.S. Pat. No. 4,670,900 which was filed in the U.S. Patent and Trademark Office on Apr. 17, 1985.

FIELD OF INVENTION

This invention relates in general to telephone systems and more particularly pertains to a device for use with the call forwarding service now provided by many telephone operating companies to their subscribers.

TELEPHONE CALL FORWARDING

Call forwarding is a service in which telephone calls placed to a subscriber's telephone number are diverted at the central station to another telephone number. The advantage of call forwarding is that incoming calls can be diverted to any other telephone number simply by instructing the central office to divert the calls to a designated telephone number. The instructions must, however, be given over the subscriber's telephone line for which the call forwarding service is provided. That is, call forwarding service is provided only for calls made to the subscriber's telephone line for which that service has been procured and all instructions to the central station for diverting those calls to another telephone number must be made over the subscriber's telephone line. For ease of reference, the subscriber's telephone line for which call forwarding service is provided is denominated "the procured service phone line". For ease of reference in the discussion herein, the procured service phone line is sometimes abbreviated to "PSPL".

Call forwarding service accommodates both pulse and tone signaling telephones. Assuming the subscriber's telephone is of the tone signaling type having a twelve button keypad, to program the system to forward calls, the initiate code "72" is dialed. Upon receipt of the dial tone, the telephone number to which the calls are to be forwarded is dialed and ringing is heard. When the phone is answered, call forwarding to that telephone number is established. It is customary to inform the person answering the phone that calls will be forwarded to that telephone. In the event the phone to which calls are to be forwarded is busy or the ring is not answered, call forwarding can be established by hanging up the subscriber's phone and within 2 minutes again dialing "72", obtaining the dial tone, dialing the number to which calls are to be forwarded, and listening for two beep tones. Receipt of the two beep tones indicates that call forwarding has been established.

To cancel call forwarding, the subscriber's telephone is taken off-hook, cancel code "73" is dialed, and the receipt of two beep tones is awaited. Receipt of the two beep tones signifies that call forwarding has been cancelled.

In some systems the # signal is used to speed up service and in those systems the # signal may be dialed immediately after the dialing of "72" or "73".

CALL FORWARDING LIMITATION

The limitation on call forwarding which requires all forwarding and cancelling instructions to be given over the subscriber's procured service phone line provides a measure of security because only persons having access to that procured service phone line can alter or cancel the call forwarding instructions. However, that limitation is often inconvenient because call forwarding instructions heretofore could not be easily changed from a station remote from the subscriber's procured service telephone, as for example, when the subscriber moves from one remote location to another.

TWO LINE TELEPHONE CALL FORWARDING DEVICE

In my U.S. Pat. No. 4,626,630, a device is disclosed that enables call forwarding instructions to be given from any telephone in the system or in any connecting system. That device, however, requires connection to two telephone lines; one of those two phone lines is the subscriber's procured service phone line and the other telephone line is a "dedicated" line over which call forwarding instructions can be given from any remote location (i.e. from any location remote from the subscriber's procured service phone). The obvious drawback of the two telephone line device is that a second telephone line must be available to act as the "dedicated" line. In many instances, a second telephone line is not available or the subscriber is unwilling to pay for the installation of a second line or the subscriber is unwilling to pay the additional charges of the telephone operating company for providing service for a second line.

THE SHORT RING SIGNAL

It has been found that when a telephone call is forwarded, before or simultaneously with the diversion of the call to the programmed phone number, that a short ring signal of less than $\frac{1}{2}$ second duration is transmitted by the central station to the subscriber's procured service phone line. In many instances the signal is so short that the subscriber's phone does not produce an audible ring. It has however, been established that each forwarded call results in the transmission of a short ring signal to the subscriber's procured service phone line. Consequently, the subscriber, when he is at a location remote from his procured service telephone, can communicate with that phone by signalling with the short ring signal. A single telephone line call forwarding device is disclosed in my parent patent application Ser. No. 724,065, now U.S. Pat. No. 4,670,900, filed Apr. 17, 1985, which utilizes the short ring signal to eliminate the need for a "dedicated" second phone line.

OBJECTS OF THE INVENTION

This application is directed to remedying certain shortcomings of the single phone line call forwarding devices disclosed in my aforesaid parent application Ser. No. 724,065.

Although that application discloses two embodiments of telephone call forwarding apparatus that require only a single telephone line for their operation, those two embodiments have certain shortcomings which accompany the operation of those embodiments.

Specifically, one embodiment requires the subscriber to call in three times in succession to obtain access to the procured service phone line (PSPL). The second embodiment, while permitting access to the PSPL with only two call-ins, requires the call forwarding device to perform a number of deprograming, and reprograming operations following every incoming call to the PSPL.

The principal objective of the instant invention is to provide a single line telephone call forwarding device which enables the subscriber to access the PSPL with only two call-ins while reducing the number of deprograming and reprograming operations performed by the call forwarding device so as to improve the reliability of the device and to extend its life.

THE DRAWINGS

SINGLE TELEPHONE LINE CALL FORWARDING DEVICE

Figure 1:
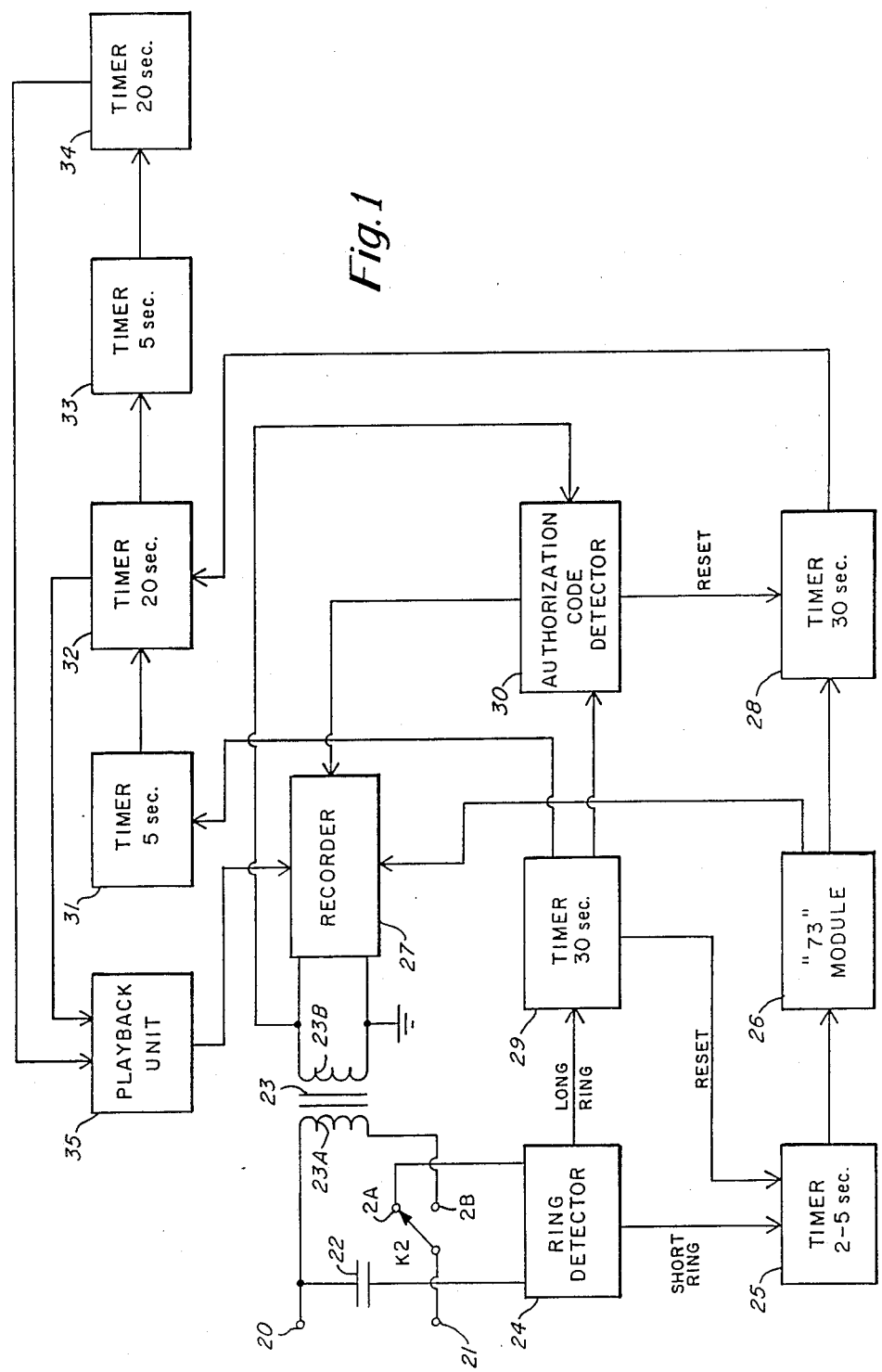
FIG. 1 is a block diagram showing the scheme of a call forwarding device that requires connection to but one telephone line.

FIG. 1 of the drawings is a block diagram showing the scheme of an embodiment of a single telephone line call forwarding device disclosed in my aforesaid parent patent application Ser. No. 724,065. That embodiment requires only two successive telephone calls to reprogram the call forwarding service provided by the telephone operating company and is preferred over the other embodiment of the invention disclosed in that parent patent application which requires three successive telephone call for reprograming of call forwarding.

In the embodiment here schematically shown in FIG. 1, the ring and tip terminals of the subscribers procured service phone line are designated by numerals 20 and 21. A ring detector 24 is connected by a D.C. blocking capacitor 22 to terminal 20 and that detector is connected to terminal 21 through contact 2A of a relay K2.

It is assumed that information pertaining to the telephone number to which calls are to be forwarded has been programmed into the recorder 27 and that the central station has been instructed to forward calls to the programmed number. In that condition, when a telephone call is made to the subscriber's procured service phone line, a short ring signal is transmitted that is detected by ring detector 24. The ring detector thereupon emits a trigger signal to timer 25 which causes that timer to commence a short timing cycle of 2 to 5 seconds duration. At the end of that cycle, the module 26 is activated by a signal from timer 25 and the module thereupon energizes the coil of relay K2, causing the armature of that relay to move from contact 2A to contact 2B. By that action, winding 23A of transformer 23 is placed across the terminals of the telephone line so that the line is seized. Following that seizure, module 26 causes cancellation code number "73" to be dialed out on the seized line. The transmission of number "73" to the central station causes cancellation of call forwarding. After the cancellation code number "73" has been dialed out, module 26 emits a signal to timer 28 that causes that timer to begin a 30 second timing cycle and at approximately the same time, the module releases the seized phone line by deenergization of the coil of relay K2. If, within that 30 second interval, no other calls are made to the subscriber's phone, timer 28 runs to the end of its cycle. At the end of that 30 second cycle, timer 28 emits a trigger signal to timer 32. Timer 32 thereupon causes the telephone line to be seized by energization of the coil of relay K2 and then emits a signal to playback unit 35 that causes recorder 27 to play out the initiate code number "72", followed by the programmed telephone number to which calls are to be diverted. At the conclusion of the 20 second cycle, timer 32 releases the seized phone line and triggers timer 33 into actuation. Timer 33 runs to the end of a five second cycle and then emits a signal that actuates timer 34. Upon being actuated, timer 34 causes the phone line to be seized by energizing the coil of relay K2 and then actuates playback unit 35. The playback unit thereupon causes the recorder to repeat the play out of number "72" and the programmed telephone number. That procedure causes call forwarding to be again established.

If, within the thirty second cycle of timer 28 a call is made to the subscriber's phone line, ring detector 24 detects the long ring signal and emits a trigger signal to timer 29 that starts the timer on a 30 second timing cycle. Timer 29, at the start of its cycle, causes timer 25 to be reset and seizes the phone line by energizing the coil of relay K2. If the proper authorization code is transmitted to code detector 30 before timer 28 completes its cycle, the operation of timer 28 is arrested by a reset signal form the code detector. Otherwise, timer 28 runs to the end of its cycle and emits a signal that actuates timer 32. Where the proper authorization code is transmitted, code detector 30 enables the recorder 27 to accept and store information from the phone line. Assuming that information is the initiate code number "72" followed by a telephone number, it is stored in the memory unit of the recorder. After timer 29 has run to the end of its thirty second cycle, it releases the seized phone line and triggers the timer 31. Timer 31, after running to the end of its five second cycle, emits a trigger signal to timer 32 that causes timer 32 to start upon its 20 second cycle, as previously described. Thereafter, timers 33 and 34 are successively triggered into action and perform the operations previously described. Conseguently, call forwarding is reprogrammed to divert calls to the phone number stored in the memory unit of the recorder. If that stored phone number was not preceded by the initiate code number "72", call forwarding is cancelled and all subsequent calls are then transmitted to the subscriber's procured service phone line. For a more detailed description of the arrangement and operation of the FIG. 1 embodiment, the reader is referred to applicant's aforesaid parent patent application whose disclosure is here incorporated by reference thereto.

In the FIG. 1 embodiment, the device cancelled call forwarding whenever a call was made to the subscriber's procured service telephone line even though the call was diverted to some other phone and if a second call was not made within 30 seconds to reprogram the stored number, the device reestablished call forwarding to the old number stored in the recorder. Consequently, the FIG. 1 device performs a sequence of operations that cancels and reestablishes call forwarding to the old number each time a call is made that does not reprogram the stored number. To avoid that mode of operation, modified devices are disclosed herein which which are arranged to perform a different sequence of operations.

DETAILED DESCRIPTION OF EMBODIMENTS OF THE INVENTION

Figure 2:
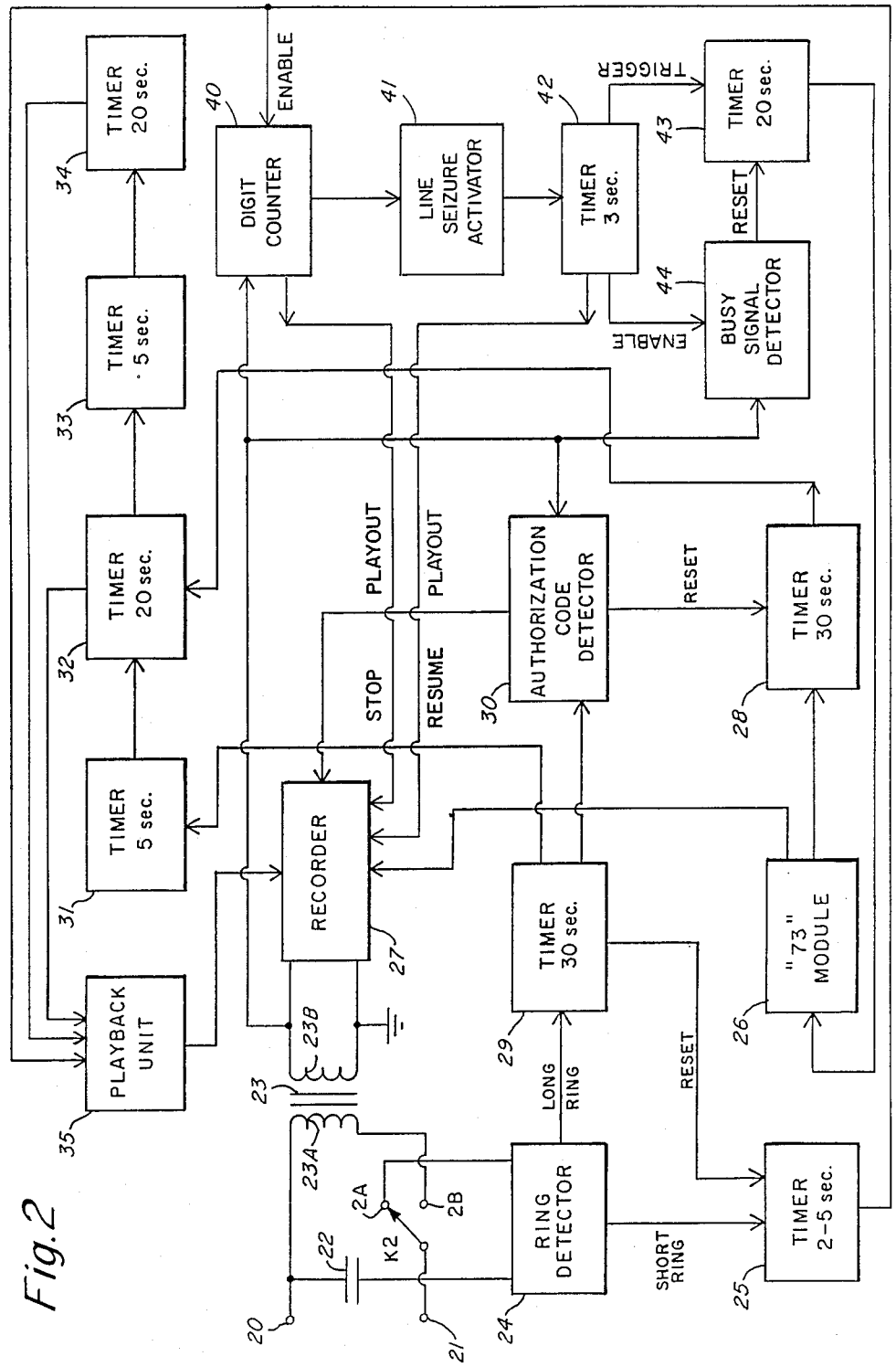
FIG. 2 is a block diagram showing the scheme of an embodiment of the invention which is an improvement upon the FIG. 1 device.

In the modified device schematically shown in FIG. 2 of the drawings, whenever a call is made that is forwarded to another telephone number, the device detects the short ring and actuates timer 25. After that timer runs through a cycle of about 2 or 3 seconds, it emits a signal that causes the device to dial the number of the phone to which calls are forwarded. If that number is busy, the device detects the busy signal and then releases the phone line without cancelling call forwarding. The busy signal signifies that the diverted call has been answered and consequently was not intended as a signal to communicate with the device inasmuch as if the call was intended as a communication signal, the caller would have immediately hung up the phone on hearing the first one or two rings. In the event a busy signal is not received at the device, the device causes call forwarding to be cancelled by dialing out cancellation code "73" and then releases the phone line. If another call is not received at the device within a preset time period after cancellation of call forwarding, the device then reestablishes call forwarding to the old phone number.

In the embodiment of the invention whose scheme is shown in FIG. 2, those elements that are the same as those in the FIG. 1 embodiment are designated by the same reference numerals. In the FIG. 2 embodiment, the trigger signal of timer 25 is outputted to playback unit 35 which, upon receiving the trigger signal, causes the recorder 27 to commence playing out the stored numbers. That arrangement is different from the FIG. 1 embodiment in which the trigger signal of timer 25 is outputted directly to the input of the "73" module 26.

Assuming an initial condition of the FIG. 2 embodiment in which (1) the armature of relay K2 is closed upon contact 2A, (2) the number "72" followed by a telephone number to which calls are to be forwarded has been programmed into the recorder 27, and (3) the local exchange has been instructed to forward calls to the programmed number, in that condition, when a telephone call is made to the subscriber's procured service phone line, the ring detector 24 detects the short ring and causes timer 25 to start its timing cycle. At the end of that cycle, timer 25 emits a signal to playback unit 35 which thereupon causes recorder 27 to commence playing out the stored numbers. Timer 25, at the end of its cycle, also emits a signal to digit counter 40 which enables that counter to count the digits played out by the recorder 27. At this time the procured service phone line has not yet been seized so that the played out digits are not transmitted over that phone line.

Digit counter arrangements of the kind suitable for employment in this invention are discussed in U.S. Pat. No. 4,251,692 which was granted on Feb. 17, 1981 on Telephone Call Restricting Apparatus. A digit counter suitable for use in this invention where the output signals of the recorder are dual frequency tones is used in a telephone toll call restriction device sold under the trademark Restrict-A-Call by Telemate Communications Corporation of New York.

The first two digits played out by the recorder comprise the initiate code "72". Upon counting those first two digits, the counter emits a "stop playout" signal to the recorder that causes the recorder to terminate the playout before the next digit is reached. At about the same time as playout is terminated, an actuator 41, in response to a signal from the counter, causes the procured service phone line to be seized by energizing the coil of relay K2 and causes a three second timer 42 to start upon its timing cycle. That three second interval is provided to insure that a dial tone is obtained on the seized line. (It is evident that at an increase in cost and complexity, the timer 41 may be replaced by a dial tone detector arranged to be activated immediately upon seizure of the procured service phone line and to emit a signal upon detection of the dial tone.) At the end of the three second period, timer 42 emits signals that cause the busy signal detector 44 to be enabled and cause timer 43 to start upon its timing cycle of twenty seconds during which timer 43 maintains seizure of the phone line. The signals emitted by timer 42 at the end of its three second period, also cause recorder 27 to resume playing out the programmed telephone numbers. Thereupon a phone call is placed from the procured service phone line to the phone line to which calls are forwarded by the call forwarding service. The busy signal detector is able to ascertain whether the called phone is busy by detection of the repetitive busy signal transmitted by the telephone company when the called phone is occupied with a previous phone call. Busy signal detectors are known to the telephone art which distinguish busy signals from other telephone signals by the monotone nature of the busy signal with its quick and short successive interruptions. A suitable busy signal detector is described in U.S. Pat. No. 3,688,043. Upon detection of a busy signal, the busy signal detector emits a reset signal to timer 43. The timer 43, in response to the reset signal, releases the phone line and restores the device to its stand-by condition. The detection of the busy signal is deemed to signify that the previous call was forwarded and is being answered by the called party. Consequently, it is assumed that the previous call was not intended to change the call forwarding instructions programmed in the recorder 27.

Where no busy signal is detected in the twenty seconds period of timer 43, the timer runs to the end of its cycle and emits a signal that activates "73" module 26. The "73" module thereupon maintains the seizure of the phone line, causes cancellation of call forwarding by transmission of the cancellation code over the seized phone line, emits a signal that causes timer 28 to start its thirty seconds timing cycle, and at about that same time, the module releases the seized phone line by deenergization of the coil of relay K2. During the cycle of timer 28, the call forwarding instructions programmed in recorder 27 can be changed by placing a phone call to the procured service phone line and transmitting the new instructions and the correct authorization code over that phone line during the thirty seconds cycle of timer 29, as previously described. The apparatus shown in FIG. 2, is arranged to require the authorization code to be transmitted before new instructions are permitted entry to the recorder. In an alternative arrangement, the authorization code can be transmitted within a preset period after the new instructions have been transmitted to a register in which those instructions are temporarily stored. Upon receipt of the authorization code, the temporarily stored instructions are then transferred into the recorder 27. Where new instructions are entered into recorder 27, call forwarding to the new phone number is automatically established in the manner previously described herein. In the event no long ring signal and proper authorization code are received within the thirty seconds period of timer 28, that timer emits an actuation signal to timer 32 and the ensuing operation of the device then causes call forwarding to be reestablished, as previously described, to the old phone number programmed in recorder 27.

A problem that may be encountered in the operation of the FIG. 2 embodiment occurs when the phone line to which calls are forwarded is part of a sequential multiple line telephone system. In that kind of system, if the phone line to which calls are forwarded is busy, the call is automatically connected to the next associated phone line that is free. In that circumstance, the busy signal detector 44 of the FIG. 2 embodiment will not detect a busy signal as long as there is one free line to which the phone call can be connected. Consequently, the failure of the busy signal detector to detect a busy signal in that circumstance does not mean that the short ring signal was intended as a phone call to reprogram the call forwarding instructions in the recorder. That short ring signal may have been intended as a normal call to be forwarded in the usual manner to the programmed phone number and may have been connected to a free line.

A similar problem is encountered when the phone line to which calls are forwarded is provided with the "call waiting" service sold by the local telephone company as an optional service. Where "call waiting" service is provided, even if a telephone call to the serviced phone line is in progress when a second phone call is made to that same phone line, the second phone call does not result in a busy signal but rather, a ringing signal is transmitted to the second caller.

In view of these problems, the FIG. 2 embodiment does not achieve the objective of reducing the number of deprograming and reprograming operations where the phone line to which calls are forwarded is provided with "call waiting" service or where that phone line is part of a sequential multiple line telephone system.

It has been discovered through experiment that the foregoing problems can be largely, but not entirely, avoided by causing the recorder 27 to dial out the phone number of the procured service phone line immediately following the forwarding of a preceding phone call (indicated by a short ring signal) instead of dialing out the telephone number of the line to which the preceding call was forwarded.

Figure 3:
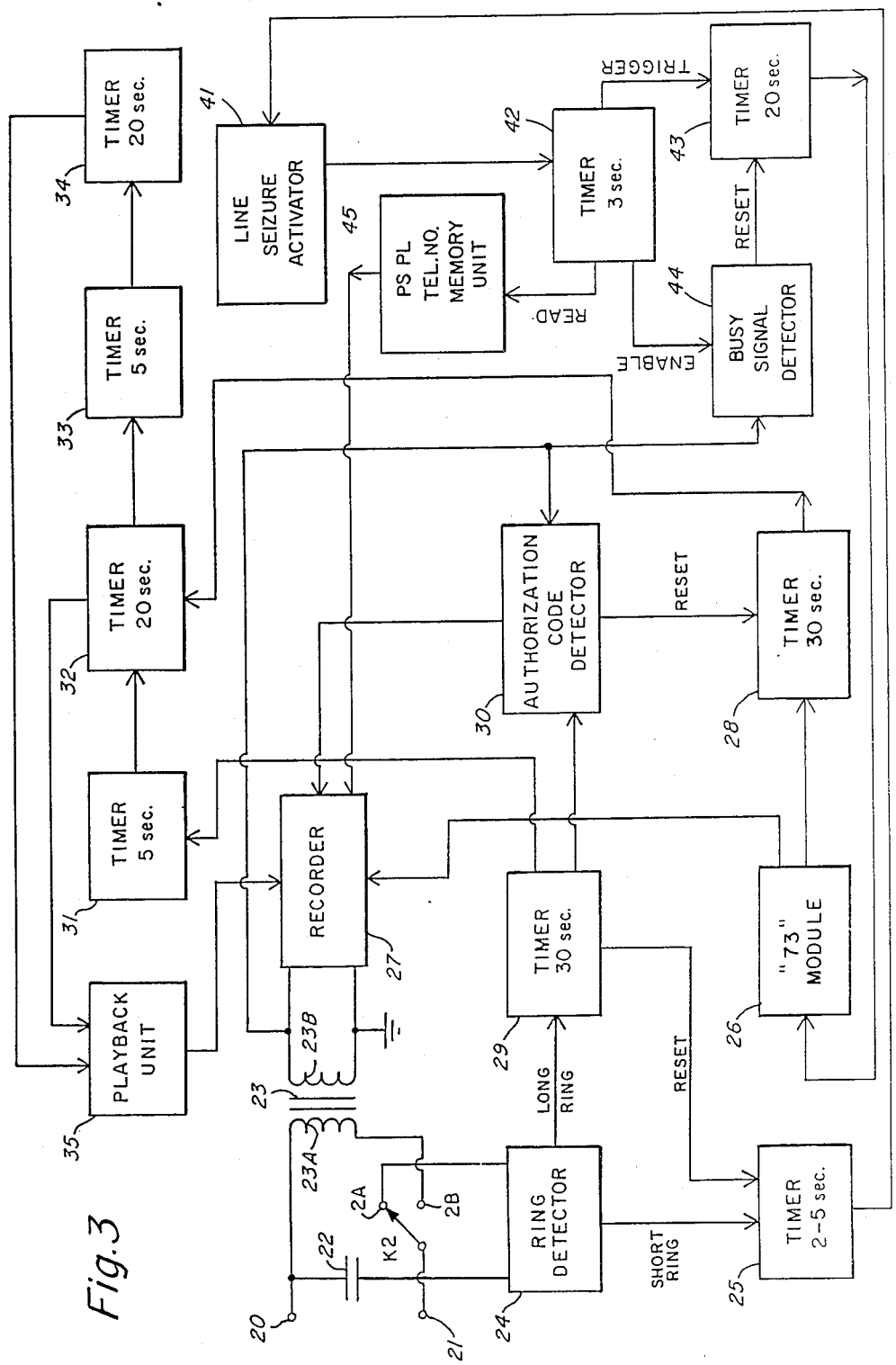
FIG. 3 is a block diagram showing the scheme of the preferred embodiment which is deemed to be an improvement upon the FIG. 2 embodiment.

FIG. 3 shows an embodiment of the invention for carrying out the modified sequence of operations in which the recorder is caused to dial out the phone number of the procured service phone line (in effect, placing a phone call to itself) soon after the detection of a short ring signal. Those elements in the FIG. 3 embodiment that are the same as those in the FIG. 2 embodiment are designated by the same reference numerals for ease in discerning the similarities and the differences between those two embodiments.

Assuming an initial stand-by condition of the FIG. 3 embodiment in which (1) the armature of relay K2 is closed upon contact 2A, (2) the telephone number of the procured service phone line is stored in the memory unit 45 in a manner enabling that number to be read out to recorder 27 in response to a "read" signal from timer 42, (3) the number "72" followed by the telephone number to which calls are to be forwarded has been programmed into recorder 27, and (4) the local exchange has been instructed to forward calls to the programmed number, when a telephone call is made to the subscriber's procured service line, ring detector 24 detects the short ring and causes timer 25 to start its timing cycle, which is preferably of 3 seconds duration. At the end of that cycle, timer 25 emits a signal to line seizure activator 41 which thereupon seizes the phone line by energizing the coil of relay K2. The energized relay seizes the line by causing the relay armature to move from contact 2A to contact 2B. The line seizure activator, after causing seizure of the phone line, emits a trigger signal to timer 42 that causes initation of a three seconds timing cycle. The three seconds period insures that a dial tone is obtained on the seized phone line. (The operation may be speeded up by replacing the timer 42 with a dial tone detector.) Upon reaching the end of its timing cycle, timer 42 emits a trigger signal to timer 43 which thereupon starts its timing cycle of twenty seconds duration. Timer 42 simultaneously emits an enable signal to busy signal detector 44 and also emits a "read" signal to memory 45. In response to the "read" signal, memory unit 45 reads out to recorder 27 the telephone number of the procured service phone line. The recorder, upon receiving the "read out" signals from memory unit 45, converts those signals either into pulses or dual frequency tones and plays them out over the seized telephone line. The memory unit 45 may have its own converter. In that circumstance, the converter in the recorder need not be used and the output of the memory unit 45 can then bypass the recorder and be applied directly to the winding 23B of the audio transformer 23.

By dialing out its own phone number in this manner, busy signal detector 44 will, in most instances, detect a busy signal where the previous call was forwarded and was answered by the called party, even where the phone line to which the call was forwarded is part of a sequential multiple line telephone system or where that phone line has "call waiting" service.

In those situations where a busy signal should have been detected but was not, timer 43, at the conclusion of its timing cycle, emits a signal which activates "73" module 26 and the device then cancels call forwarding and then reinstates call forwarding to the number programmed in recorder 27, as previously described.

In addition to employing a busy signal detector, a ringing signal detector may also be utilized to detect a ringing signal for the called number. When so employed, those two detectors, in effect, monitor the condition at the far end of the phone line—that is, they monitor the condition of the phone line to which the device has placed a phone call. Both those detectors may be situated in a unit that is here termed a "line monitor" for convenience.

The line monitor is coupled to the procured service phone line and operates to monitor that line for the receipt of a busy signal or for the receipt of a ringing signal (i.e. a signal indicating that the called phone is being rung). Where a busy signal is detected, the call forwarding device is reset to its stand-by state as previously described. Where a ringing signal is detected by the ringing signal detector of the line monitor, an actuation signal is emitted to the "73" module 26 which causes that module to cancel call forwarding. The subsequent operation of the device then proceeds as previously described.

Figure 4:
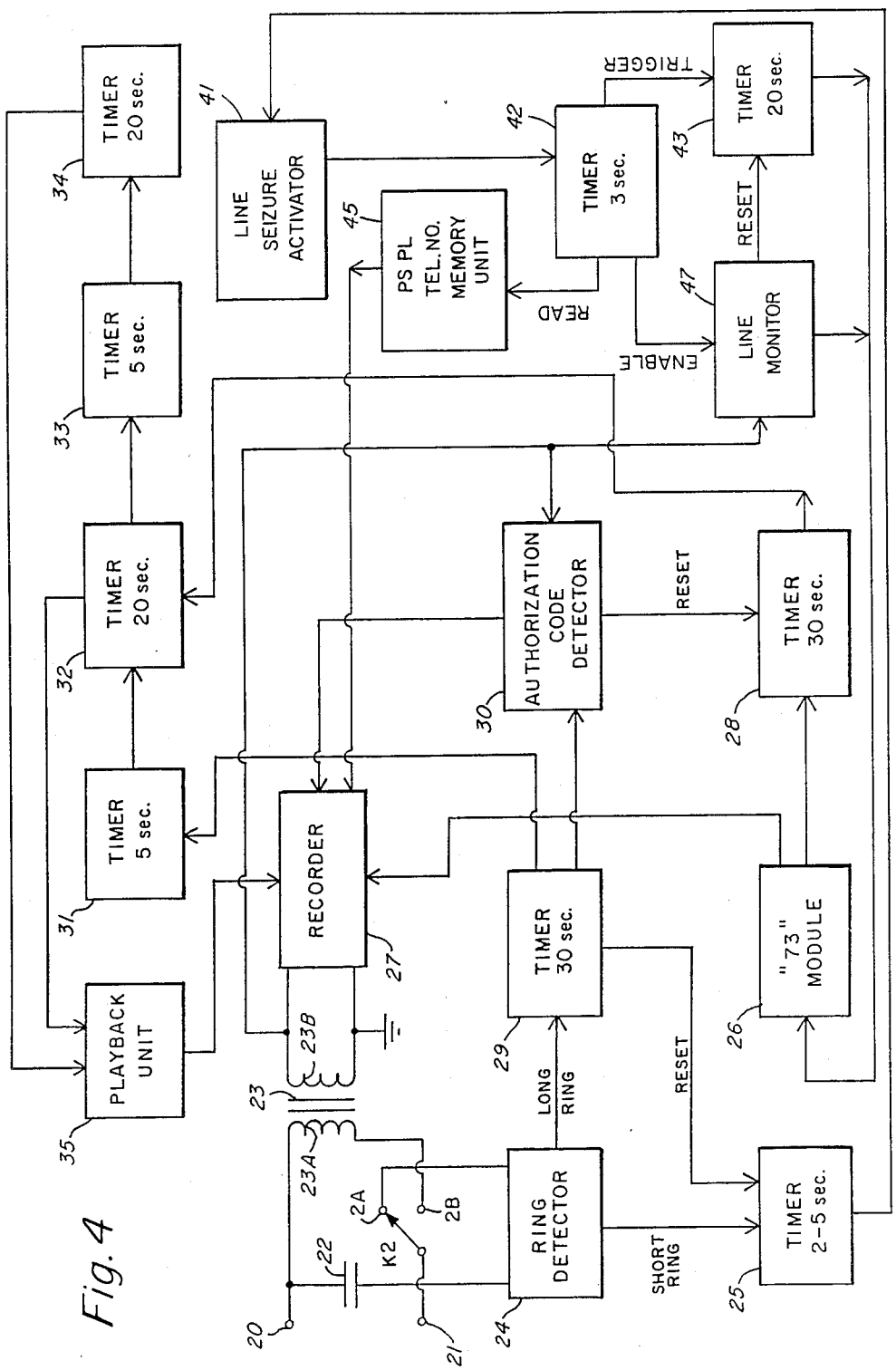
FIG. 4 is a block diagram showing the scheme of an embodiment of the invention employing a line monitor.

FIG. 4 schematically depicts an embodiment of the invention utilizing a line monitor unit 47. That embodiment is similar to the FIG. 3 embodiment and consequently where the elements of both those embodiments are the same, they are designated by the same reference numbers. The line monitor unit 47 has a busy signal detector in addition to a ringing signal detector and where a busy signal is detected, the operation is identical to that of the FIG. 3 embodiment. However, where a ringing signal is detected, the line monitor unit 47 emits an actuation signal to the "73" module 26 and simultaneously resets timer 43. The ensuing operation then proceeds as previously described.

The operation of the FIG. 4 embodiment is based upon the premise that the party (assumed to be the subscriber) who places the call that results in the short ring will immediately hang up the phone upon receiving the first ringing signal where that phone call is intended for communication with the call forwarding device as a prelude to changing the instructions in the recorder or as a prelude to cancelling call forwarding. In those instances where that phone call is intended to be forwarded for establishing communication in the normal manner, the calling party (usually someone other than the subscriber) will not immediately hang up the phone but instead will wait for the call to be answered.

Figure 5:
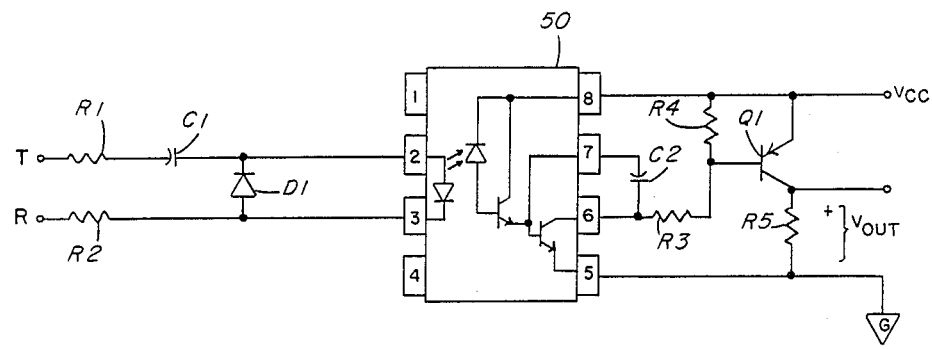
FIG. 5 is a schematic diagram of a ring detector that is suitable for employment in the invention.

In the embodiments discussed herein, the ring detector can, for example, be of the kind described in the Optoelectronics/Fiber Optics Applications Manual, 2nd ed., McGraw Hill, at page 3.71. That telephone ring detector is schematically shown in FIG. 5. In that drawing, the optocoupler 50 used in the ring detector is indicated to be of the split-darlington type. The tip and ring terminals for connection to the telephone line are designated T and R in the drawing. Resistors R1 and R2 in the input circuit typically are each of 100 ohms. C1 is a d.c. blocking capacitor and diode D1 serves as a half wave rectifier. The optocoupler 50 isolates the input circuit from the output circuit. In the output circuit, the signal current from the optocoupler is integrated by capacitor C2. For the detection of a short ring signal, the time constant of the integrator is chosen so that the after a few cycles in the short ring, the charge on C2 changes enough to turn on output transistor Q1. Consequently, turn on of transistor Q1 signifies the detection of a short ring signal.

For detection of long ring signals, the output circuit of the FIG. 5 ring detector is modified to substantially increase the integration time so that at least one long ring, and preferably two long rings, is required to charge C2 to the level required to turn on the output transistor. With that modified arrangement, the turn on of the output transistor signifies the detection of a long ring signal.

Where two such ring detectors are employed, one for short ring detection and the other for long ring detection, both detectors will have their output transistors turned on by long ring signals. To prevent any unwanted response to the short ring detector in that circumstance, the short ring detector, as shown in FIGS. 1, 2, 3, and 4 has its output arranged to actuate the timer 25. Upon actuation, timer 25 commences upon its timing cycle of 2 to 5 seconds duration. During that 2 to 5 seconds period, the long ring detector emits a signal to timer 29 and thereupon timer 29 emits a signal that resets timer 25. (Obviously, the signal from the long ring detector can be used more directly to reset timer 25.) By that action, the apparatus is able to distinguish a short ring signal from a long ring signal.

Instead of using two separate ring detectors as suggested above, a single ring detector having two output circuits may be employed. In that arrangement, one output circuit is arranged to detect long ring signals only; the other output circuit is arranged to detect short ring signals. Inasmuch as the short ring detection output circuit will also respond to long rings, the previously described arrangement utilizing timer 25 can be employed to enable the apparatus to distinguish a short ring signal from a long ring signal.

Obviously, modifications that do not depart from the essential aspects of the invention can be made in the embodiments that have been here described. It is, for example, evident that the duration of the timing cycles can be changed or that the timing functions of the various timers can be provided by a single timing signal source.

In view of the obvious changes that can be made, it is intended that the invention not be restricted to the precise embodiments here described. Rather, it is intended that the scope of the invention be construed in accordance with the appended claims, having regard for the substitution of equivalents and other changes that are obvious to those skilled in the telephone and electronics arts.

I claim:

1. A single telephone line call forwarding device comprising
   (i) a ring detector for detecting long and short ring signals,
   (ii) connection means for connecting the ring detector to a phone line for which call forwarding service has been procured, the connection means having a switch for enabling seizure of that procured service phone line,
   (iii) a recorder for storing information pertaining to the number to which calls are to be forwarded,
   (iv) means for coupling the recorder to the procured service phone line for enabling the stored information to be changed over that phone line from a remote location,
   (v) means for seizing the procured service phone line after detection by the ring detector of a short ring signal and thereafter causing the recorder to dial out the phone number to which calls are forwarded, and
   (vi) means for detecting the presence of a busy signal and releasing the phone line upon receipt of a busy signal.

2. A single telephone line call forwarding device comprising
   (i) a ring detector for detecting long and short ring signals,
   (ii) connection means for connecting the ring detector to a phone line for which call forwarding service has been procured, the connection means having a switch for enabling seizure of that procured service phone line,
   (iii) a recorder for storing information pertaining to the number to which calls are to be forwarded,
   (iv) means for coupling the recorder to the procured service phone line for enabling the stored information to be changed over that phone line from a remote location,
   (v) means for seizing the procured service phone line after detection by the ring detector of a short ring signal and thereafter causing dialing out on the seized line of the telephone number of the procured service phone line, and
   (vi) line monitor means for detecting the condition at the far end of the phone line, the line monitor means causing the procured service phone line to be released upon receipt of a busy signal, and the line monitor means causing cancellation of call forwarding upon the detection of a ringing signal.

3. The single telephone line call forwarding device according to claim 2, wherein
the means for causing dialing out on the seized line of the telephone number of the procured service phone line includes a memory unit having information stored therein which designates that telephone number.

* * * * *